US012392758B2

(12) United States Patent
Mavrikakis et al.

(10) Patent No.: US 12,392,758 B2
(45) Date of Patent: Aug. 19, 2025

(54) MONITORING CATALYTIC CHEMICAL REACTIONS USING LIQUID CRYSTALS

(71) Applicants: Wisconsin Alumni Research Foundation, Madison, WI (US); Cornell University, Ithaca, NY (US)

(72) Inventors: Emmanouil Mavrikakis, Middleton, WI (US); Jake Gold, Houston, TX (US); Trenton Wolter, North St. Paul, MN (US); Nicholas Abbott, Lansing, NY (US); Nanqi Bao, Ithaca, NY (US); Huaizhe Yu, Ithaca, NY (US); Ayushi Tripathi, Ithaca, NY (US)

(73) Assignees: Wisconsin Alumni Research Foundation, Madison, WI (US); Cornell University, Ithaca, NY (US)

( * ) Notice: Subject to any disclaimer, the term of this patent is extended or adjusted under 35 U.S.C. 154(b) by 844 days.

(21) Appl. No.: 17/530,692

(22) Filed: Nov. 19, 2021

(65) Prior Publication Data

US 2023/0160866 A1   May 25, 2023

(51) Int. Cl.
*G01N 31/10* (2006.01)
*B01J 19/00* (2006.01)
(Continued)

(52) U.S. Cl.
CPC .......... *G01N 31/10* (2013.01); *B01J 19/0006* (2013.01); *B01J 19/24* (2013.01); *C09K 19/12* (2013.01); *B01J 2219/00186* (2013.01); *C09K 2019/0437* (2013.01); *C09K 2019/122* (2013.01); *C09K 2019/123* (2013.01)

(58) Field of Classification Search
CPC ..... G01N 31/10; G01N 31/00; B01J 19/0006; B01J 19/24; B01J 19/00; C09K 19/12; C09K 19/10
See application file for complete search history.

(56) References Cited

U.S. PATENT DOCUMENTS

| 10,928,306 B2 | 2/2021 | Mavrikakis et al. | |
|---|---|---|---|
| 2007/0004046 A1* | 1/2007 | Abbott | B82Y 30/00 349/1 |

(Continued)

OTHER PUBLICATIONS

Activation of Molecular Oxygen and the Nature of the Active Oxygen Species for CO Oxidation on Oxide Supported Au Catalysts D. Widmann and R. J. Behm Accounts of Chemical Research 2014 47 (3), 740-749 DOI: 10.1021/ar400203e (Year: 2014).*

(Continued)

*Primary Examiner* — Elizabeth A Robinson
*Assistant Examiner* — Tingchen Shi
(74) *Attorney, Agent, or Firm* — Bell & Manning, LLC (57) ABSTRACT

Methods for monitoring catalytic chemical reactions are provided. Such a method may comprise (a) exposing a solid surface to conditions to induce a chemical reaction of reactants at an interface formed between the solid surface and a liquid crystal, wherein the solid surface catalyzes the chemical reaction and the liquid crystal is characterized by an anchoring orientation that changes during the chemical reaction; and (b) measuring the anchoring orientation of the liquid crystal at one or more time points and at one or more locations on the solid surface during step (a). Systems for carrying out the methods are also provided.

19 Claims, 12 Drawing Sheets (51) Int. Cl.
  *B01J 19/24* (2006.01)
  *C09K 19/12* (2006.01)
  *C09K 19/04* (2006.01)

(56) References Cited

U.S. PATENT DOCUMENTS

| | | |
|---|---|---|
| 2012/0288951 A1 | 11/2012 | Acharya et al. |
| 2016/0018371 A1 | 1/2016 | Acharya et al. |
| 2016/0025636 A1 | 1/2016 | Abbott et al. |
| 2016/0274084 A1 | 9/2016 | Acharya et al. |
| 2017/0212088 A1 | 7/2017 | Acharya et al. |
| 2019/0212254 A1* | 7/2019 | Mavrikakis ............ G01N 21/21 |
| 2021/0318231 A1 | 10/2021 | Mavrikakis et al. |

OTHER PUBLICATIONS

Colorimetric sensor array based on gold nanoparticles: Design principles and recent advances, Jingwei Sun, Yuexiang Lu, Liuying He, Jiawei Pang, Fengyi Yang, Yueying Liu, TrAC Trends in Analytical Chemistry, vol. 122, 2020 (Year: 2020).*

L.T. Roling et al., "Towards first-principles molecular design of liquid crystal-based chemoresponsive systems," Nature Communication, vol. 7, 2016, pp. 1-7, published Nov. 2, 2016.

Chemical Processing Staff, "Liquid Crystals Strengthen Sensor Accuracy," Chemical Processing, 2017, Putman Media, Schaumberg, IL, pp. 1-7, Jan. 16, 2017.

James E. Hallett et al., "X-ray reflectivity reveals ionic structure at liquid crystal-aqueous interfaces," Soft Matter, vol. 13, 2017, pp. 5535-5542, published Aug. 2, 2017.

Gold et al., "Hydrogen Adsorption-and Hydrogenation-Triggered Orientation Transitions of Liquid Crystals Adsorbed on Palladium Surfaces," AIChE Annual Meeting, 2020, 2020 Virtual AIChE Annual Meeting.

Jake Gold, "First Principles Design of Liquid-Crystalline Based Chemoresponsive Materials," Thesis defense given at U.W. Madison, Sep. 2, 2021.

* cited by examiner

FIG. 1

1000 ppm H₂
15 min Exposure

*H₂ dissociative adsorption*

FIG. 2A

100% H₂
3.5 hr Exposure

*Hydrogenation of 5CB to 5MAB*

FIG. 2B

Adsorption Energies of Relevant Species on Pd(111)

| | Displacement ←→ | No Displacement ←→ |
|---|---|---|

| Equation | Energy (eV) |
|---|---|
| $(PhCH_2)_2NH \rightarrow (PhCH_2)_2NH^*$ | −1.81 |
| $PhCH_2NH_2 \rightarrow PhCH_2NH_2^*$ | −1.46 |
| $PhCHNH \rightarrow PhCHNH^*$ | −1.34 |
| $H_2 \rightarrow 2H^*$ | −1.33 |
| $PhCN \rightarrow PhCN^*$ | −1.05 |
| $H_2O \rightarrow H_2O^*$ | −0.45 |
| $PhCH_3 \rightarrow PhCH_3^*$ | −0.37 |

FIG. 6B 0.1%
7OBPNH2 in
7OBPNO2 on
8ML Pd on Au

FIG. 7B

7OBPNO2 on 8ML Pd on Au
Temp: 37±0.5 C

MONITORING CATALYTIC CHEMICAL REACTIONS USING LIQUID CRYSTALS

REFERENCE TO GOVERNMENT RIGHTS

This invention was made with government support under 1921696 and 1921722 awarded by the National Science Foundation. The government has certain rights in the invention.

BACKGROUND

A variety of instrumentation and methods have been developed in order to monitor the progress of chemical reactions, including heterogeneous chemical reactions. These analytical techniques may be used to extract kinetic and mechanistic information for such chemical reactions, which is useful for developing improved catalysts. However, existing analytical techniques, e.g., infrared spectroscopy and Raman spectroscopy, may suffer from various drawbacks such as inefficiency, lack of sensitivity, complexity, and high cost. In addition, at least some existing analytical techniques are restricted to providing information for only specific types of chemical reactions, rather than being more universally applicable as monitoring techniques. Some of these analytical techniques are also restricted in their ability to be implemented in a high throughput format that allows for simultaneous screening of multiple catalytic surfaces or surfaces with spatial gradients in catalyst composition.

SUMMARY

Provided herein are methods for monitoring catalytic chemical reactions using liquid crystals.

In embodiments, a method for monitoring a catalytic chemical reaction comprises (a) exposing a solid surface to conditions to induce a chemical reaction of reactants at an interface formed between the solid surface and a liquid crystal, wherein the solid surface catalyzes the chemical reaction and the liquid crystal is characterized by an anchoring orientation that changes during the chemical reaction; and (b) measuring the anchoring orientation of the liquid crystal at one or more time points and at one or more locations on the solid surface during step (a).

Systems for carrying out the methods are also provided.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

DETAILED DESCRIPTION

Provided herein are methods for monitoring catalytic chemical reactions taking place at an interface formed between a liquid crystal and a solid surface. Here (and throughout the present disclosure), the term "catalytic" is used to indicate that the chemical reaction being monitored is one that is catalyzed by the underlying solid surface. This includes use of the present methods to monitor chemical reactions that have no measurable reaction rate under the conditions being used absent the underlying solid surface. Although a variety of catalytic chemical reactions may be monitored with the present methods, in embodiments, the reactions involve at least two reactant species (e.g., a bimolecular reaction). The reactant species may be the same (e.g., A+A), but often they are chemically distinct from one another (e.g., A+B). As further described below, in embodiments, one of the reactant species is a mesogen of the liquid crystal. Unimolecular catalytic chemical reactions may also be monitored by the present methods. However, in embodiments, such reactions are excluded, e.g., such as the dissociative adsorption of a single species on the solid surface.

Illustrative chemical reactions which may be monitored using the present methods include hydrogenation reactions, involving the addition of hydrogen, $H_2$, (i.e., a first reactant species) to a second reactant species (i.e., B). Related to hydrogenation reactions are hydrogenolysis reactions in which the addition of hydrogen is accompanied by bond cleavage in the second reactant species. Hydrogenolysis reactions encompass, e.g., hydrodesulfurization reactions and hydrodenitrogenation reactions. Other chemical reactions which may be monitored include hydration reactions involving the reaction of water (i.e., a first reactant species)

with a second reactant species. Dehydration reactions may also be monitored, involving the loss of water from two reactant species (which may be the same or chemically distinct from one another). Similarly, carboxylation reactions may be monitored, involving the reaction of carbon dioxide (i.e., a first reactant species) to a second reactant species to form a carboxylic acid. Nitration reactions may be monitored, involving the addition of a nitro ($NO_2^+$) group to a second reactant species. Other chemical reactions which may be monitored include redox reactions, which encompass oxidation reactions involving the use of oxidants such as $O_3$ and $O_2$ (i.e., a first reactant species) to oxidize a second reactant species as well as CO oxidation reactions involving the use of CO (i.e., a first reactant species) to reduce a second reactant species; and chlorination reactions involving the use of $Cl_2$ (i.e., a first reactant species) to chlorinate a second reactant species (e.g., the reaction of $Cl_2$ with alkenes or aromatic compounds (e.g., benzene)). In embodiments, the chemical reaction being monitored is not the oxidation of CO by $O_3$.

The reactants involved in present methods are dictated by the chemical reaction to be monitored. Illustrative reactants involved in the chemical reactions described above include $H_2$ (hydrogenation/hydrogenolysis), $H_2O$ (hydration), alcohols (dehydration), $CO_2$ (carboxylation), $NO_2^+$ (nitration), oxidation ($O_3$, $O_2$), CO oxidation (CO), chlorination ($Cl_2$). As noted above, in embodiments, at least one of the reactants is a mesogen of the liquid crystal itself. For example, in each of the chemical reactions described above, the second reactant species, "B", may be a mesogen of the liquid crystal.

Regarding the liquid crystal, this term refers to an organic composition in an intermediate or mesomorphic state between solid and liquid. This organic composition comprises mesogens, the chemical compounds that make up the liquid crystal phase of matter. Thus, the term "liquid crystal" encompasses the mesogens making up the liquid crystal. A variety of liquid crystals may be used. However, suitable liquid crystals are those that do not chemically degrade at the conditions being used to induce the desired chemical reaction. As further described below, these conditions may include the use of elevated temperatures (i.e., greater than room temperature), e.g., a temperature of from greater than room temperature to 100° C., greater than room temperature to 75° C., or greater than room temperature to 60° C. Thus, in embodiments, the liquid crystal being used is one that does not chemically degrade at such elevated temperatures. In addition, as further described below, suitable liquid crystals are those that exhibit a detectable change in their anchoring orientation as the relevant reactants undergo the desired chemical reaction.

Illustrative liquid crystals that may be used include polymeric liquid crystals, elastomeric liquid crystals, thermotropic liquid crystals, lyotropic liquid crystals, columnar liquid crystals, nematic discotic liquid crystals, calamitic nematic liquid crystals, ferroelectric liquid crystals, discoid liquid crystals, bent-core liquid crystals, liquid crystalline gels, and cholesteric liquid crystals. Composites comprising a liquid crystal and another component, e.g., particles, polymers, etc. may be used. Liquid crystals that are achiral to which a chiral sensitizer molecule was added may be used. Specific illustrative mesogens which may be used include those in Table 1 of U.S. Pat. Pub. No. 202103182311, which is hereby incorporated by reference for purposes of the mesogens in Table 1.

Figure 1:
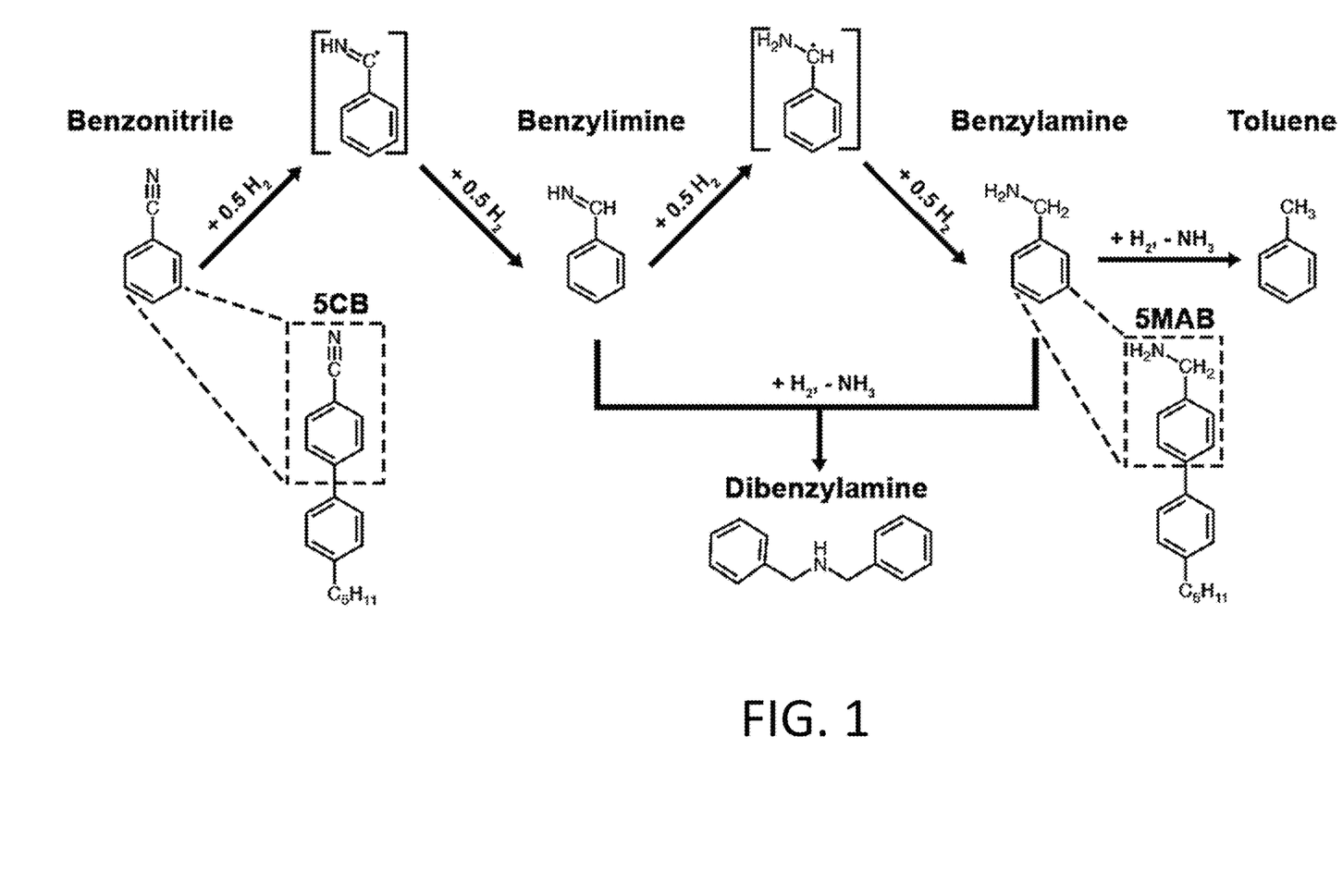
FIG. 1 depicts reaction paths for the hydrogenation of the liquid crystal 4-pentyl-4' cyanobiphenyl (5CB), containing a benzonitrile head group, to the primary amine 4'-n-pentyl [1,1'-biphenyl]-4-methanamine (5MAB), containing a benzylamine head group.
Figure 3:
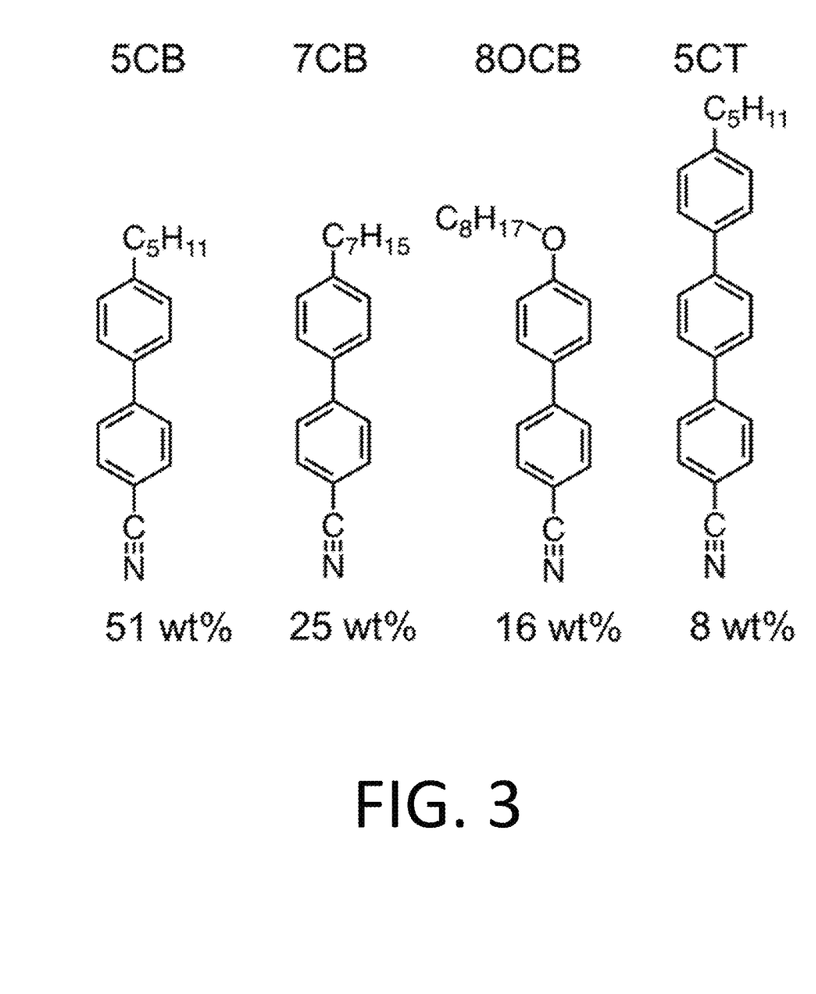
FIG. 3 shows the composition of the liquid crystal E7.
Figure 6A:
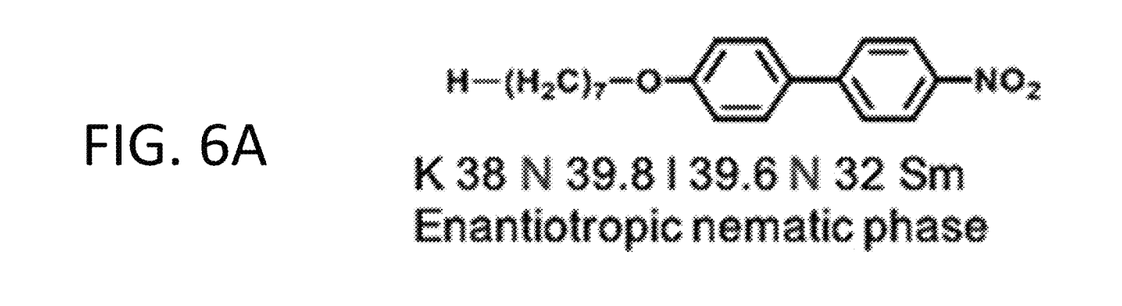
FIG. 6A shows the structure of the liquid crystal 7OBPNO$_2$ and its phase transition temperature.

Additional non-limiting examples of liquid crystals include those comprising 4-(4-pentylphenyl)-pyridine (PD); PCH series liquid crystals, such as those comprising PCH5 (4-(trans-4'-pentylcyclohexyl)-benzonitrile); and those comprising fluorinated mesogens, such as TL205 (a mixture of cyclohexane-fluorinated biphenyls and fluorinated terphenyls). In embodiments, TL205 may be doped with PD. In embodiments, the liquid crystal is a nematic CB series liquid crystal, such those composed of 4-pentyl-4'-cyanobiphenyl (5CB), the structure of which is shown in FIG. 1. In embodiments, the liquid crystal has the composition shown in FIG. 3, which may be referred to as an "E7" liquid crystal. In embodiments, the liquid crystal is composed of 4-heptoxy-4'-nitrobiphenyl ($7OBPNO_2$), the structure of which is shown in FIG. 6A.

Figure 6B:
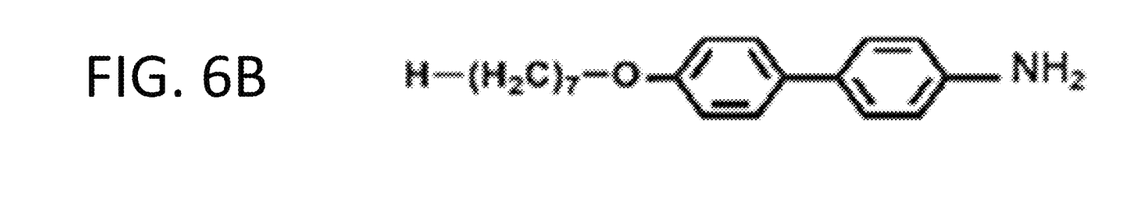
FIG. 6B shows the structure of the liquid crystal after the hydrogenation reaction, i.e., the corresponding amine, 7OBPNH$_2$.

As noted above, in embodiments, at least one of the reactants in the chemical reaction being monitored is a mesogen of the liquid crystal. Specifically, one type of mesogen of the liquid crystal or multiple types of mesogens (including all types) of the liquid crystal may comprise a reactive moiety that is capable of undergoing the desired chemical reaction with the other reactant, e.g., any of the first reactant species of the chemical reactions described above. Thus, the reactive moiety depends upon the desired chemical reaction to be monitored. However, illustrative reactive moieties include a nitrile group (e.g., a benzonitrile group), a nitro group (e.g., a nitrobenzyl group), a benzoate group (e.g., a methyl benzoate group), a benzoic acid group, an isothiocyanate group, and an aniline group. Other reactive moieties that may be used follow from the desired chemical reaction to be monitored (e.g., chlorination of an alkyl group or an aromatic group). If not already present, any of the mesogens disclosed herein may be modified to include any of these reactive moieties. By way of illustration, as shown in FIG. 1, the benzonitrile group of the mesogen, 4-pentyl-4' cyanobiphenyl (5CB) can be made to react with $H_2$ in a hydrogenation reaction catalyzed by an underlying Pd solid surface to form 4'-n-pentyl[1,1'-biphenyl]-4-methanamine (5MAB). Similarly, the mesogens of the E7 liquid crystal shown in FIG. 3 each comprise a benzonitrile group. As another example, as shown in FIG. 6A-6B, the nitrobenzyl group of $7OBPNO_2$ can be made to react with $H_2$ in a hydrogenation reaction catalyzed by an underlying Pd solid surface to form $7OBPNH_2$. Such a nitrobenzyl group may also undergo catalyzed chemical reactions with ozone or gas phase Cl atoms.

The liquid crystal being used in the present methods is characterized by its anchoring orientation relative to the underlying solid surface. In general, the anchoring orientation of a liquid crystal gives rise to certain optical properties which may be detected, and thus quantified, using known techniques, e.g., cross polarized microscopy. Using cross polarized microscopy, a homeotropic anchoring orientation (i.e., mesogens oriented perpendicular (although not necessarily perfectly perpendicular) to the solid surface) corresponds to a minimum amount of transmitted light (i.e., a dark state). A planar anchoring orientation (i.e., mesogens oriented parallel (although not necessarily perfectly parallel) to the solid surface) corresponds to a maximum amount of transmitted light (i.e., a bright state). Intermediate anchoring orientations result in an amount of transmitted light that is between that which corresponds to the homeotropic and planar anchoring orientations. Any of the anchoring orientations may be indicated by an effective tilt angle, the angle at which the liquid crystal is orientated as compared to the surface normal of the solid surface. Other known optical and/or electrical techniques may be used to detect the anchoring orientation of the liquid crystal.

As the anchoring orientation of the liquid crystal is sensitive to its environment, its anchoring orientation may change as the environment changes. The present methods leverage this property to correlate changes in liquid crystal anchoring orientation with the progression of a desired chemical reaction, including heterogeneous catalyzed bimolecular chemical reactions taking place at the interface of the liquid crystal and the underlying solid surface. More specifically, the liquid crystal being used in the present methods may be characterized by an initial anchoring orientation prior to the chemical reaction. By "prior to the chemical reaction," it is meant at a time point before, or at the start of (i.e., t=0), exposure to conditions that induce the desired chemical reaction. The liquid crystal may be characterized by a different, final anchoring orientation after the chemical reaction. By "after the chemical reaction," it is meant a time point at which the chemical reaction is substantially complete (e.g., all available reactants have undergone the chemical reaction). Intermediate anchoring orientations may be used to indicate partially complete chemical reactions, e.g., due to slow kinetics and insufficient reaction time. The specific types of orientations for the various anchoring orientations of the liquid crystal, e.g., initial anchoring orientation, final anchoring orientation, intermediate anchoring orientation, are not limited, provided there is a detectable change in anchoring orientation that can be measured during the chemical reaction. However, in embodiments, the initial anchoring orientation is a planar orientation and the final anchoring orientation is a homeotropic orientation.

It is noted that the present methods are not limited to the use of a mesogen(s) of the liquid crystal as one of the reactants in the desired chemical reaction, i.e., non-reactive mesogen(s)/liquid crystals may also be used. For example, the present methods may make use of a non-reactive liquid crystal comprising a reactive dopant which comprises a reactive moiety capable of undergoing the desired chemical reaction. Any of the reactive moieties described above may be used. In such embodiments, however, the desired chemical reaction involving the reactive dopant is accompanied by a detectable change in the anchoring orientation of the non-reactive liquid crystal. This may occur, e.g., because the binding energy/binding orientation of the reactive dopant is different before and after the chemical reaction, thereby affecting the environment, and thus, the anchoring orientation, of the non-reactive liquid crystal.

As noted above, the solid surfaces being used in the present methods are those which catalyze the desired chemical reaction, including chemical reactions which have no measurable reaction rate under the conditions being used absent the solid surface. The solid surfaces generally comprise a metal, including metal alloys. Late transition metals (and alloys thereof) may be used including Au, Pd, Pt, Cu, Rh, Zn, Ni, Co, Fe, Ir, Re (and alloys thereof). Bimetallic alloys may be used, e.g., AuPd, AuPt, AuCu, AuAg, PdPt, PdCu, PdAg, PtCu, PtAg, CuCo. Alloys of Zn and alloys of Sn may also be used. In embodiments, the solid surface has a single composition, e.g., a single type of metal or metal alloy. In other embodiments, the solid surface has a composition that varies so that different locations on the solid surface (e.g., different x, y coordinates on the solid surface) have different compositions. In other such embodiments, the solid surface has a composition that continuously varies in at least one direction across the solid surface. In still other embodiments, an array of solid surfaces may be used in which members of the array have different compositions, e.g., different metals/metal alloys. Individual members of the array may be composed of a single composition or be composed of a composition that varies as described above. In this way, the present methods may be used to screen and compare large numbers of materials for their catalytic properties (i.e., activity and selectivity).

The present methods are carried out using conditions which induce the chemical reaction being monitored. The conditions refer to parameters such as temperature, a period of time, and a concentration (e.g., pressure) of the relevant reactant(s). The specific values of such parameters being used in the method depend upon the chemical reaction being monitored. As noted above, the anchoring orientation of the liquid crystal is measured during the chemical reaction. The anchoring orientation of the liquid crystal may be measured as a function of time, i.e., at multiple time points during the chemical reaction. This allows for a determination of a response time for the liquid crystal. (See FIG. 4A.) The response time may be defined as the time required for the anchoring orientation of the liquid crystal to change between two distinct anchoring orientations, e.g., from an initial to a final anchoring orientation. The anchoring orientation of the liquid crystal may also be measured as a function of location, i.e., at different locations, on the solid surface supporting the liquid crystal. This is useful for embodiments in which the composition of the solid surface varies as described above.

The conditions being used to induce the chemical reaction may be varied over a range of values, which is useful to extract kinetic and/or mechanistic information for the desired chemical reaction. For example, the present methods may comprise inducing the chemical reaction and measuring the anchoring orientation at multiple temperatures in order to determine an activation energy barrier for the desired chemical reaction (see Example 1 and FIG. 4B). As another example, the present methods may comprise inducing the chemical reaction and measuring the anchoring orientation at multiple reactant concentrations in order to determine a reaction order (also see Example 1). Such kinetic and mechanistic information is useful in the screening and development of improved catalysts.

It is noted that not all combinations of liquid crystals, solid surfaces, and conditions allow for a correlation of liquid crystal anchoring orientation with the progression of a desired chemical reaction. However, as described in the Examples, below, theoretical calculations may be used to guide selection of suitable combinations, e.g., by determining the relative binding energies of the relevant species and the activation energy barriers in the desired chemical reaction for a particular combination. Similarly, optical microscopy may be used to confirm suitability of the selected combination. The theoretical calculations may also be used to evaluate the thermodynamic driving forces for desired chemical reactions and free energy barriers that influence the kinetics of such reactions. For example, even if the relative binding energies of the relevant species indicate an energetically favorable thermodynamic driving force for a desired chemical reaction, there may be kinetic barriers that can be identified by the calculations

EXAMPLE

Figure 2A:
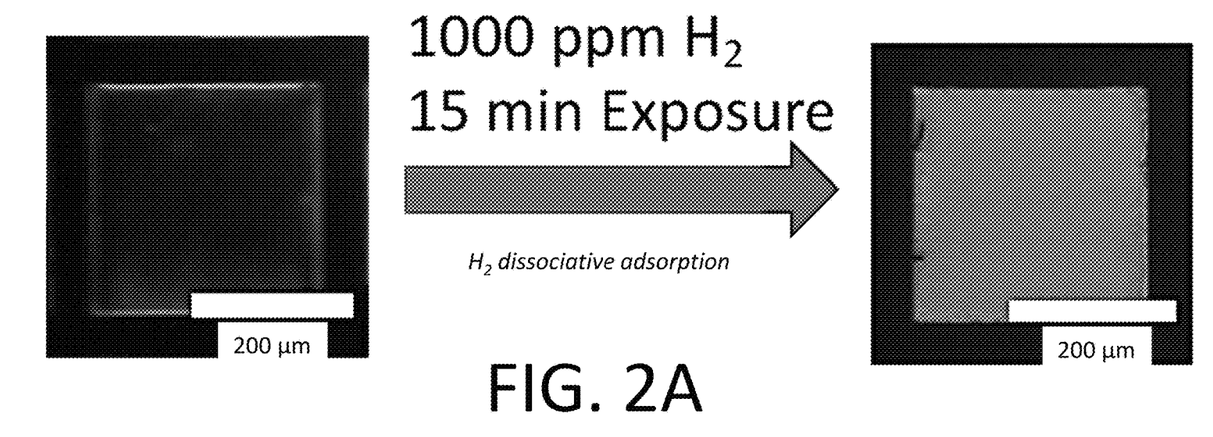
FIG. 2A shows an image of the experimental response of the liquid crystal 5CB adsorbed on a Pd surface to exposures of 1000 ppm $H_2$ (FIG. 2A) and to exposures of 100% $H_2$ at longer times (FIG. 2B). The conditions of FIG. 2A induce dissociative adsorption of $H_2$ and are insufficient to induce a detectable response of the liquid crystal due to hydrogenation of 5CB. By contrast, the conditions of FIG. 2B induce hydrogenation of 5CB in 3.5 hrs.
Figure 2B:
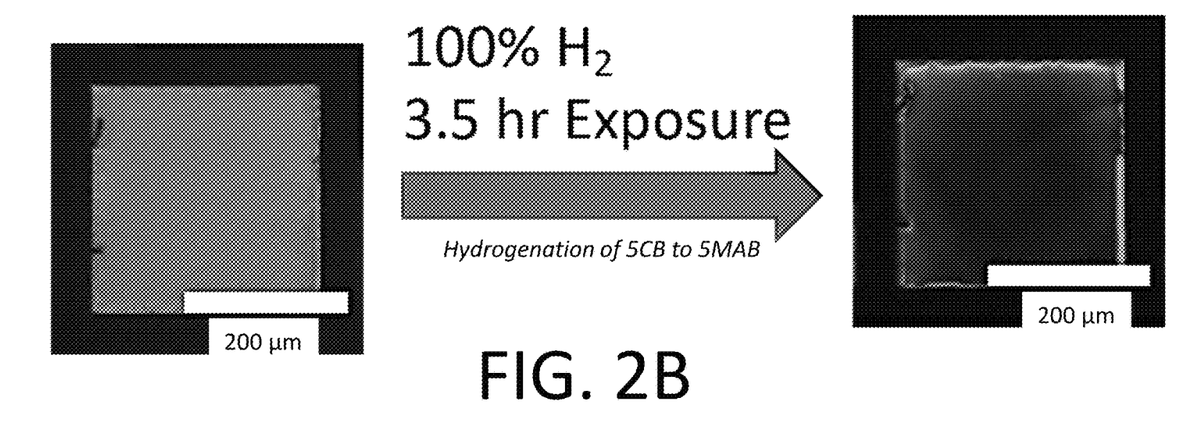
Figure 2C:
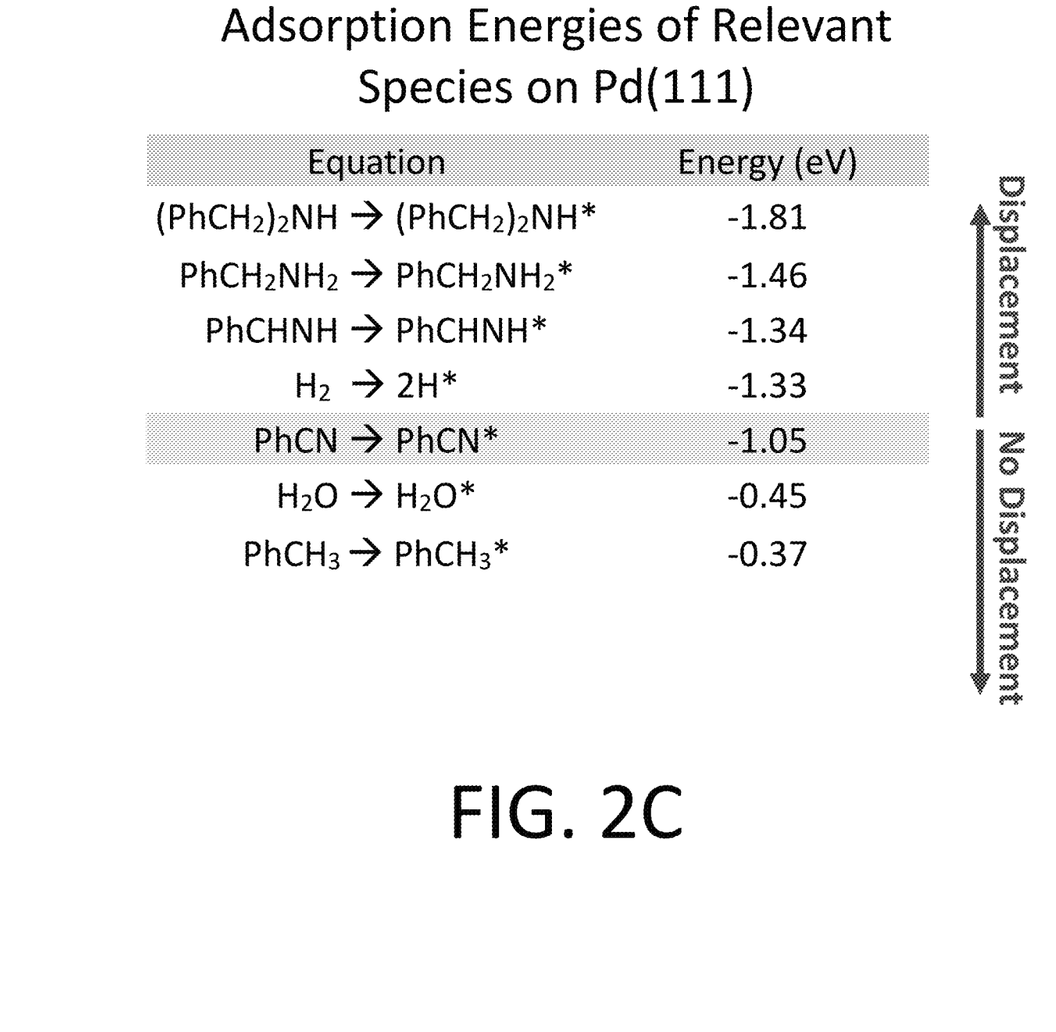
FIG. 2C shows the DFT calculations of adsorption energies of the various species involved in the experiments of FIGS. 2A and 2B. The experiments are in agreement with the DFT calculations.

Example 1: Liquid-Crystal Based Monitoring of the Hydrogenation of a Benzonitrile Group The liquid crystal 5CB contains a benzonitrile group, which can be made to undergo hydrogenation to benzylamine, a reaction catalyzed by Pd following the scheme shown in FIG. 1. Density Functional Theory (DFT) calculations were conducted to determine that $H_2$ dissociation can displace 5CB (bound by the CN head group) on a Pd(111)

surface. In agreement with calculations, experiments show that pure $H_2$ is able to displace 5CB adsorbed onto an electrochemically deposited Pd film (8 monolayers Pd supported on Au film), thus triggering an orientational change of the LC from homeotropic (dark) to planar (bright) within 1 min (see FIG. 2A and FIG. 4A (left portion of the plot)). This optical response correlates to the unimolecular dissociative adsorption of $H_2$. By contrast and directly relevant to the present methods, additional calculations show that the formation of 5MAB (benzylamine head group) as the hydrogenation reaction consumes the adsorbed hydrogen over longer times, thus triggering the LC to homeotropic anchoring. This optical response correlates to the desired bimolecular hydrogenation reaction. As shown in FIG. 2B, these calculations are also confirmed by experiments in which an orientational change of the LC from planar (bright) to homeotropic (dark) is clearly observed. The present methods are focused on the optical response shown in FIG. 2B, which demonstrates the concept of using the LC to monitor hydrogenation reactions.

Figure 4A:
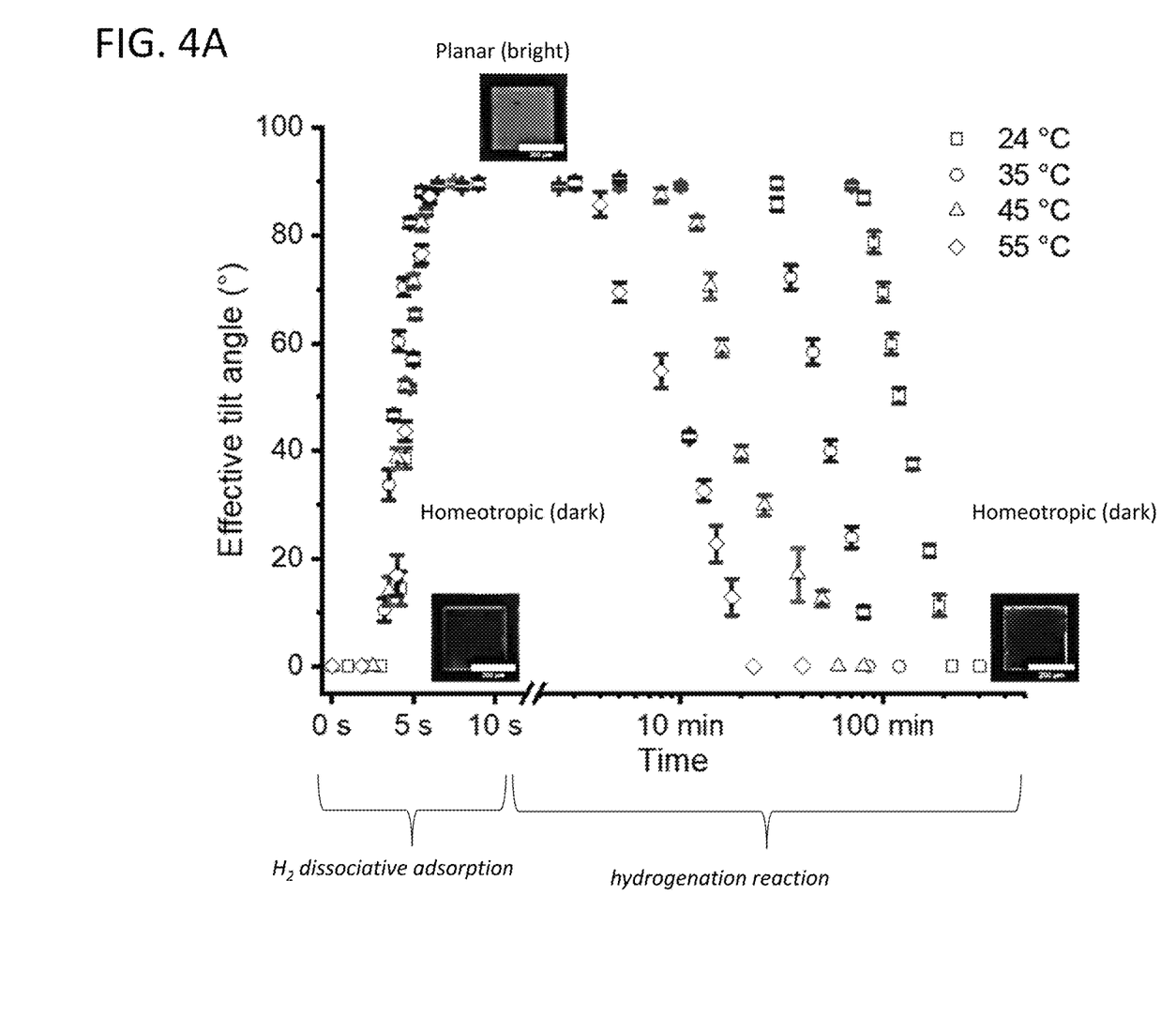
FIG. 4A plots the effective tilt angles from the surface normal for films of E7 in the center of the transmission electron microscopy (TEM) grid during exposure to a vapor of 100% of $H_2$ over time at different temperatures. The measurements are spatial averages over the sample shown in the inset of the figure.
Figure 4B:
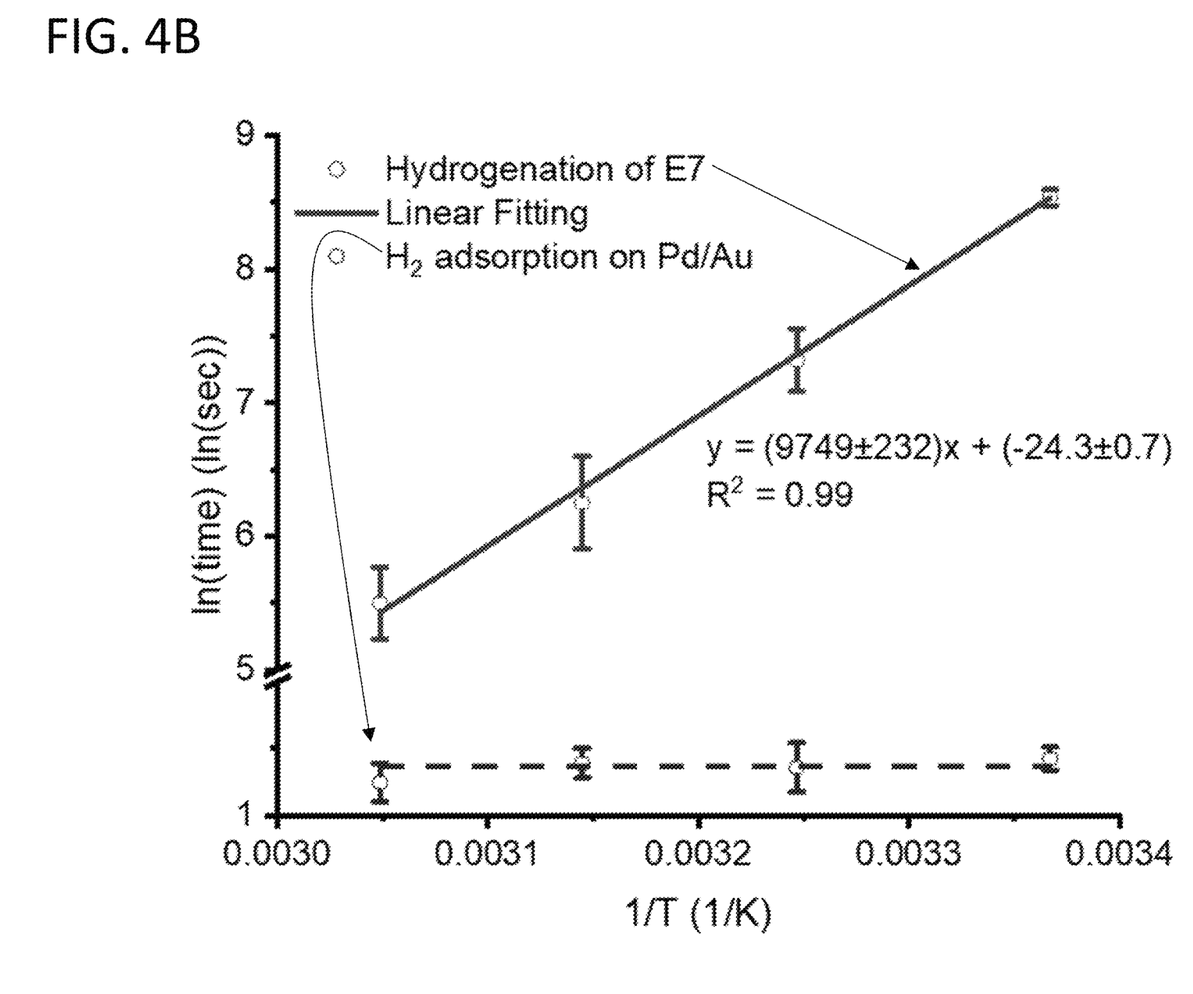
FIG. 4B plots the averaged response time of E7 supported on 8 ML Pd on Au films to 100% of $H_2$ at different temperatures from 5 replicates, respectively. The response time is defined as the time required to reach 85° (bright to dark) in effective tilt angle for the hydrogenation and the time to reach 10° (dark to bright) in effective tilt angle for the $H_2$ adsorption.

The kinetics of the hydrogenation of LCs were studied using the dynamics of the measured optical response. To study the dynamics of the optical response at different temperatures, the liquid crystal E7 was used, which is a mixture of the mesogens shown in FIG. 3. This liquid crystal E7 has a wider temperature range of nematic phase as compared to 5CB. As shown in FIG. 4A (right portion of the plot), E7 exhibited a faster hydrogenation transition (bright to dark) at higher temperatures. By contrast, the dynamics of $H_2$ adsorption was mostly unchanged (dark to bright) (left portion of the plot). This trend is even more apparent when the natural log of response time vs temperature is plotted as shown in FIG. 4B. Specifically, as shown in FIG. 4B, the slope of the curve for $H_2$ adsorption is zero. This observation is consistent with a diffusion-limited process, as diffusivity does not change exponentially with temperature. However, as also shown in FIG. 4B, the natural log of response time for the hydrogenation response is inversely proportional to the temperature. This result indicates that higher temperatures allow for exponentially faster responses due to this system being reaction kinetics limited. An apparent activation barrier of 0.84 eV was extracted from this plot. This shows that the optical response of an LC may be used to monitor the kinetics of heterogeneous chemical reactions at different temperatures, thereby allowing the determination of apparent activation energies as well as other key catalytic performance parameters for a wide range of combinations of solid surfaces and liquid crystals. Although not shown here, the dynamics of the measured optical response was also measured at different $H_2$ pressures to determine a reaction order of 0.43.

The results of this example also establish that the present methods may be used to screen and study kinetics of reactions at catalytic surfaces using various optical characterization techniques. This enables unique insights into catalytic reaction mechanisms, including molecular orientation or other microscale features of a reaction. In addition, due to the very small size of the chemoresponsive materials, they are ideal for high-throughput screening of heterogeneous catalysts. For example, arrays of metal alloy compositions may be displayed on surfaces, and the spatiotemporal response of the liquid crystal may be imaged to identify compositions within the arrays that possess a targeted catalytic activity. Additionally, various metrics and descriptors of the optical response may be identified by using computer vision methods to facilitate analysis of the optical response of the liquid crystal. In this way, liquid crystals arrayed on metal or metal alloy surfaces may be used to optimize catalyst design as well as to discover new catalysts.

Figure 5:
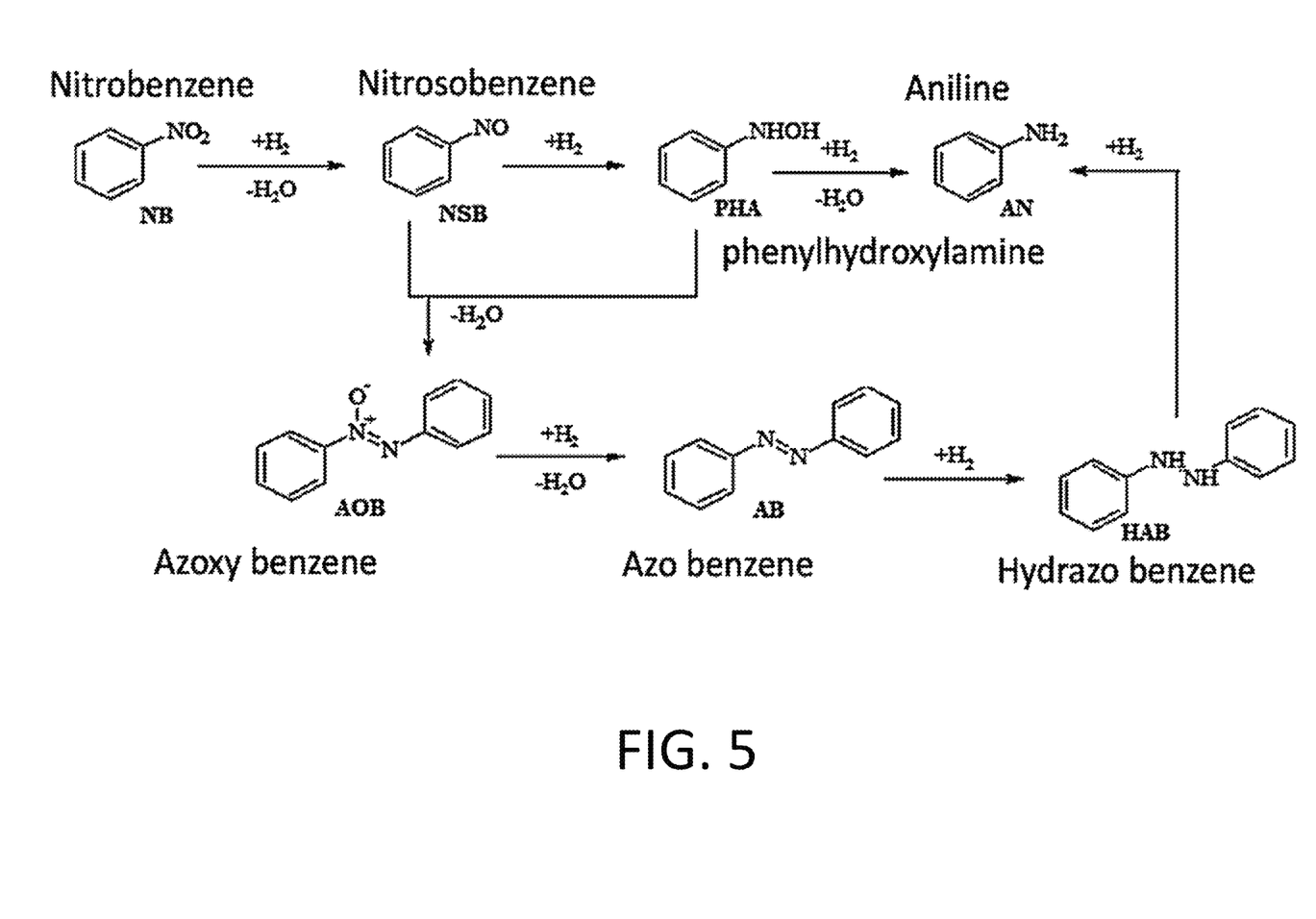
FIG. 5 depicts the mechanism of the hydrogenation of nitrobenzene.

Example 2: Liquid-Crystal Based Monitoring of the Hydrogenation of a Nitrobenzene Group Nitrobenzene can undergo hydrogenation to form aniline on Pd particles via the mechanism shown FIG. 5. The Pd-catalyzed reaction is believed to occur around 80° C. to 90° C. To evaluate whether this chemical reaction may be correlated to an anchoring transition (i.e., orientational change) of a liquid crystal, an $NO_2$ terminated LC mesogen was synthesized (7OBPNO$_2$). The structure of this mesogen (hydrogenation reactant) is shown in FIG. 6A. The structure of the resulting hydrogenation product (7OBPNH$_2$) is shown in FIG. 6B.

Figure 7A:
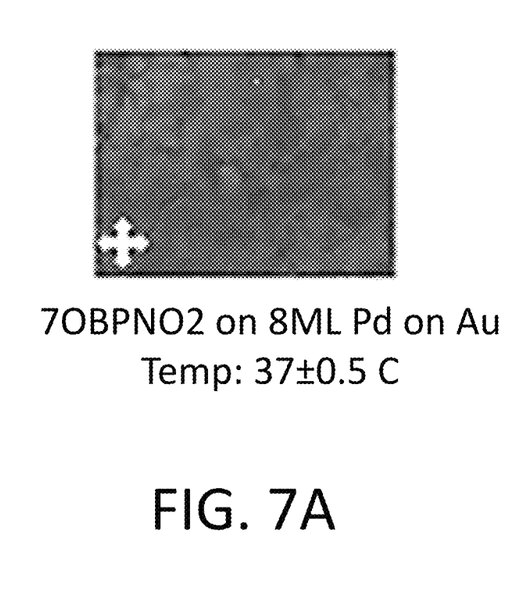
FIG. 7A shows an optical micrograph of 7OBPNO$_2$ on 8 ML Pd on Au, indicating planar anchoring.
Figure 7B:
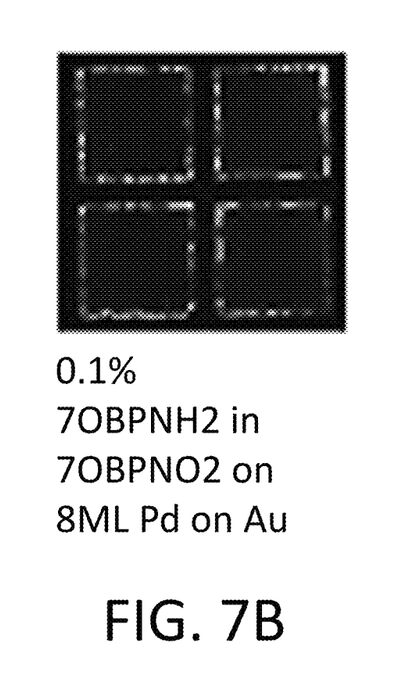
FIG. 7B shows an optical micrograph of 0.1% 7OBPNH$_2$ in 7ONPNO$_2$ on 8 ML Pd on Au, indicating homeotropic anchoring.

An 8±0.5 ML of Pd on an Au surface was prepared by electrochemical deposition. It was found that 7OBPNO$_2$ adopts planar anchoring on 8±0.5 ML Pd on Au in its nematic phase as indicated by a bright optical appearance by cross polarized microscopy (see FIG. 7A). As shown in FIG. 7B, it was also observed that a 0.1% mixture of 7OBPNH$_2$ in 7OBPNO$_2$ is sufficient to result in homeotropic anchoring on 8±0.5 ML Pd on Au.

Figure 8:
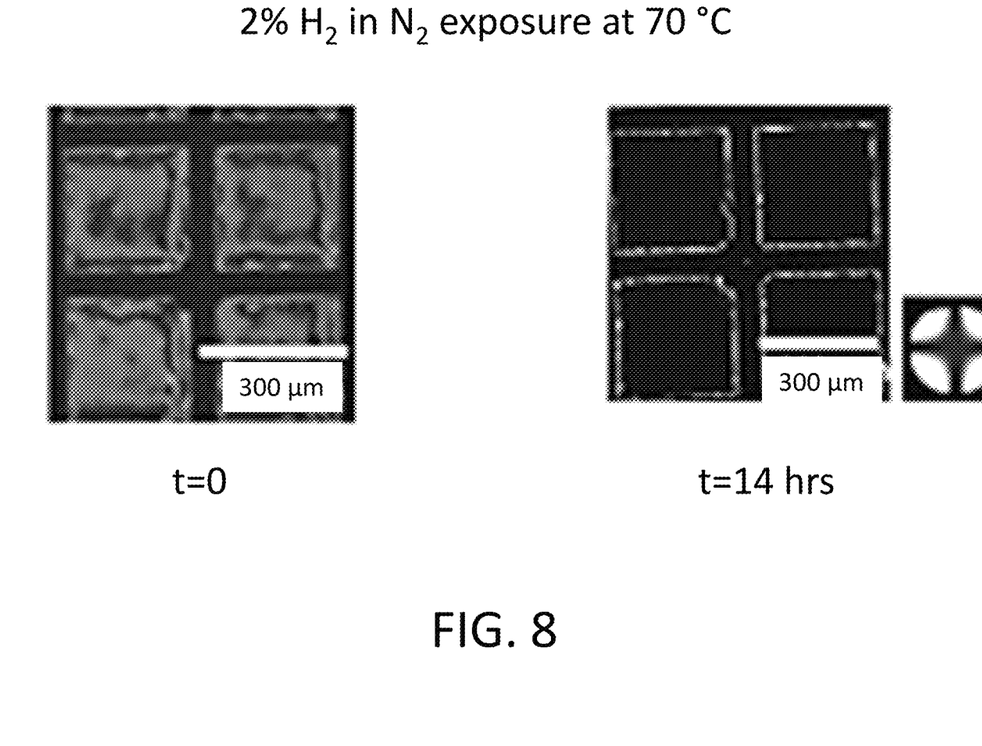
FIG. 8 shows 7OBPNO$_2$ on 8 ML Pd on Au exposed to 2% $H_2$ in $N_2$ at 70° C. at t=0 (pre-hydrogenation reaction, left image) and at t=14 hours (post-hydrogenation reaction, right image).

Next, a 7OBPNO$_2$ LC film on 8 ML Pd on Au was exposed to 2% $H_2$ in nitrogen at 70° C. (isotropic phase for the LC). As shown in the left image of FIG. 8, at t=0 (pre-hydrogenation reaction), planar anchoring was observed. As shown in the right image of FIG. 8, after 14 hours and upon cooling to 37° C., homeotropic anchoring was observed. These results demonstrate that the reaction of 7OBPNO$_2$ with adsorbed hydrogen at elevated temperatures leads to an anchoring transition.

Figure 9A:
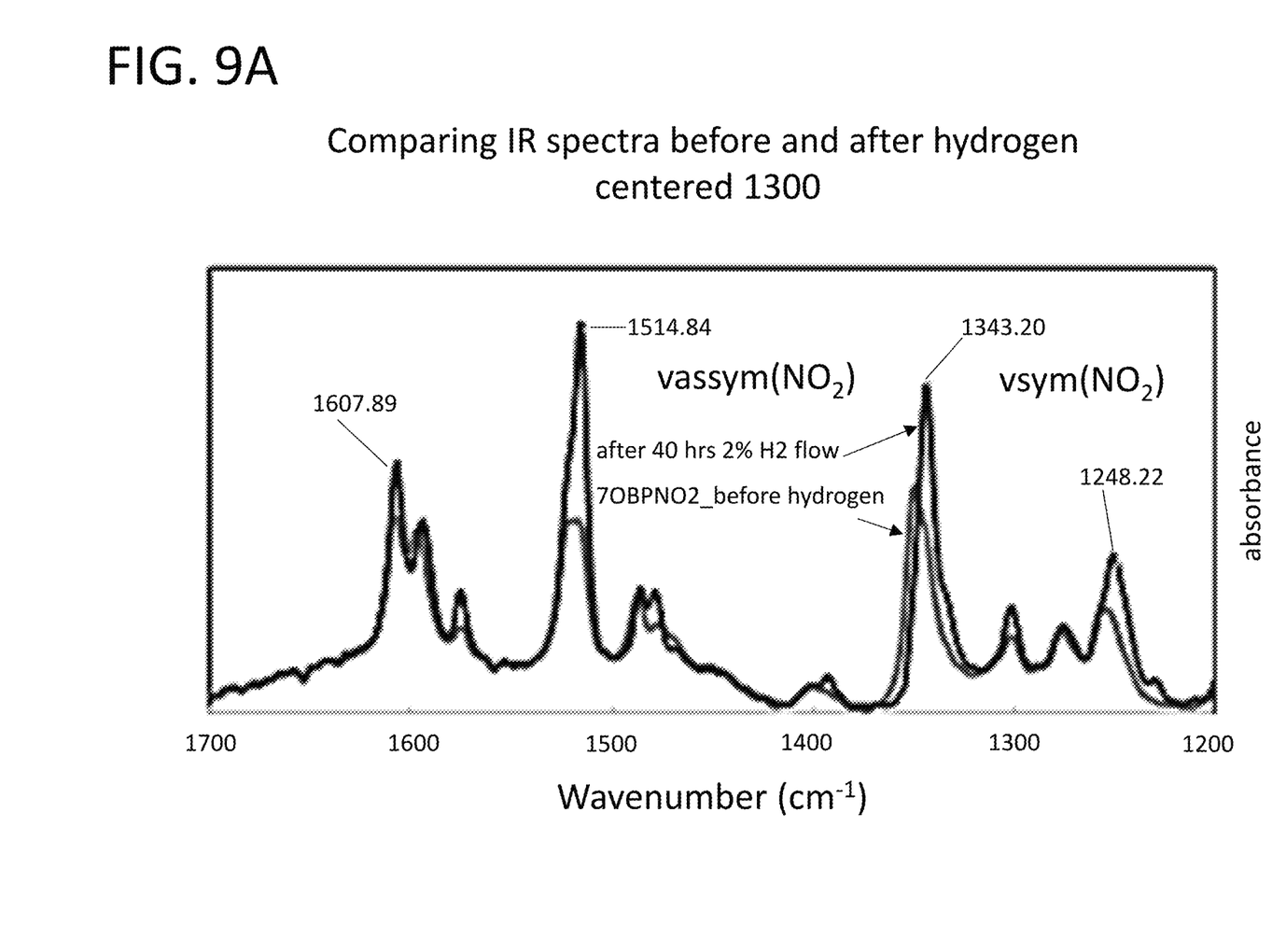
FIGS. 9A-9B show the polarization modulation-infrared reflection adsorption spectroscopy (PM-IRRAS) spectra of 7OBPNO$_2$ before (black) and after 2% $H_2$ exposure (red).
Figure 9B:
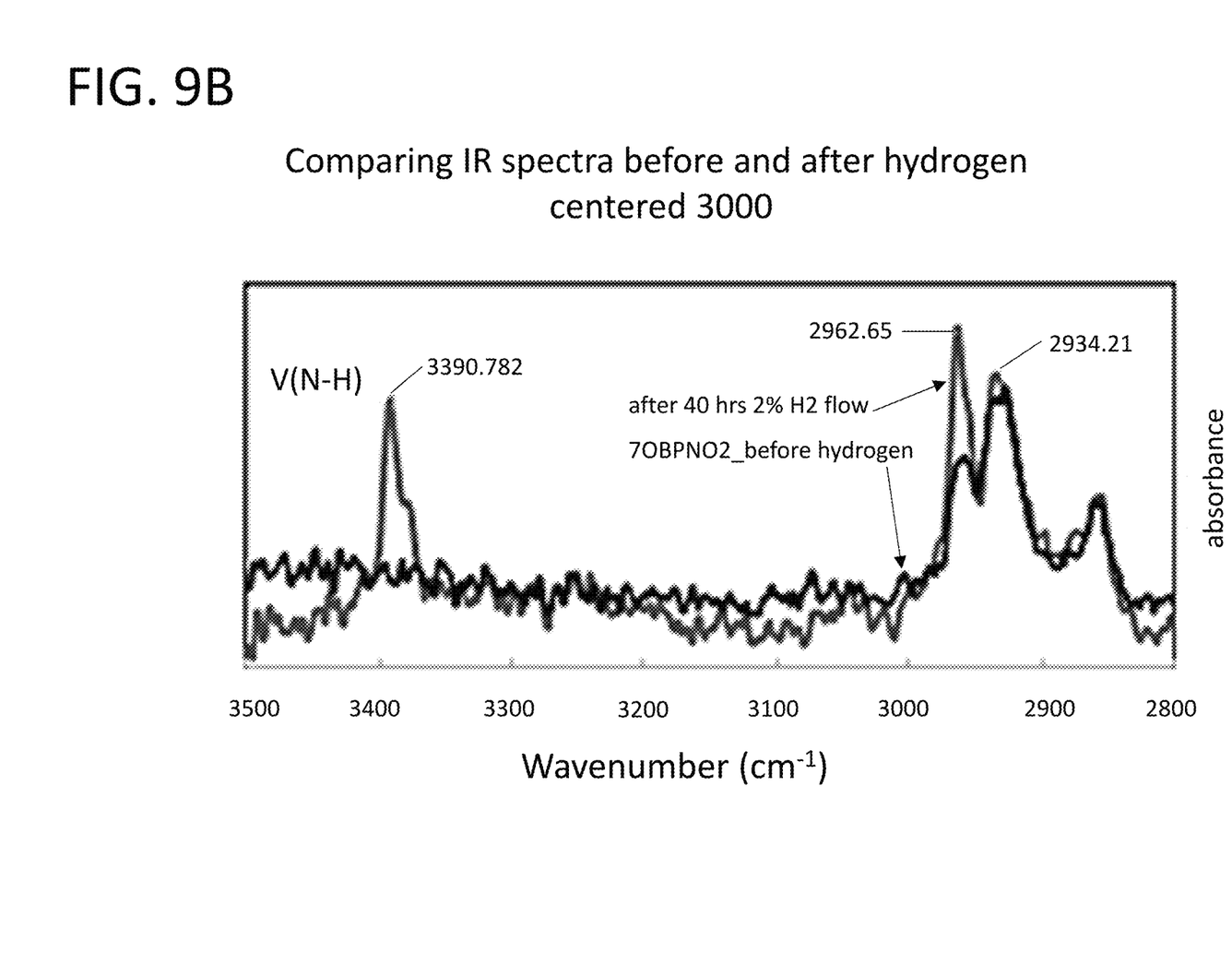

Fourier Transformed Polarization-Modulation Infrared Reflectance Absorbance Spectroscopy (PM-IRRAS) was also performed to study the hydrogenation of the $NO_2$-terminated LC at 37° C. As shown in FIGS. 9A-9B, it is observed that the intensity of the $NO_2$ stretch decreases (1343 cm$^{-1}$, 1514 cm$^{-1}$) along with the appearance of a new peak at 3390 cm$^{-1}$. These results indicate that the $NO_2$ terminated LC undergoes a hydrogenation reaction and forms an NH containing product.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A method for monitoring a catalytic chemical reaction, the method comprising:
   (a) exposing a solid surface to conditions to induce a chemical reaction of reactants at an interface formed between the solid surface and a liquid crystal, wherein the solid surface catalyzes the chemical reaction and the liquid crystal is characterized by an anchoring orientation that changes during the chemical reaction, wherein the reactants comprise a reactant species that is a reactive moiety of a mesogen of the liquid crystal; and
   (b) measuring the anchoring orientation of the liquid crystal at one or more time points and at one or more locations on the solid surface during step (a).

2. The method of claim 1, wherein the chemical reaction is a bimolecular chemical reaction between a first reactant species and a second reactant species.

3. The method of claim 1, wherein the reactive moiety is a nitrile group, a nitro group, a benzoate group, a benzoic acid group, an isothiocyanate group, or an aniline group.

4. The method of claim 1, wherein the reactive moiety is a nitro group.

5. The method of claim 1, wherein the chemical reaction is a hydrogenation reaction, a hydrogenolysis reaction, a hydration reaction, a dehydration reaction, a carboxylation reaction, a nitration reaction, a redox reaction, or a chlorination reaction.

6. The method of claim 1, wherein the chemical reaction is a nitration reaction.

7. The method of claim 1, wherein the solid surface comprises a metal or a metal alloy.

8. The method of claim 1, wherein the solid surface has a composition that varies across the solid surface.

9. The method of claim 1, further comprising providing an array of solid surfaces, the array comprising at least two members, wherein the solid surface is one of the at least two members of the array, and wherein the at least two members of the array have different compositions.

10. The method of claim 1, wherein the liquid crystal is E7 liquid crystal or wherein the liquid crystal comprises 4-heptoxy-4'-nitrobiphenyl.

11. The method of claim 1, wherein the liquid crystal is characterized by an initial anchoring orientation prior to the chemical reaction and a different, final anchoring orientation after the chemical reaction.

12. The method of claim 11, wherein the initial anchoring orientation is a planar anchoring orientation and the final anchoring orientation is a homeotropic orientation.

13. The method of claim 1, wherein step (b) is carried out at multiple time points to determine a response time for the liquid crystal, wherein the response time is the time required for the anchoring orientation of the liquid crystal to change between two distinct anchoring orientations.

14. The method of claim 13, wherein the two distinct anchoring orientations are an initial anchoring orientation prior to the chemical reaction and a final anchoring orientation after the chemical reaction.

15. The method of claim 1, further comprising repeating steps (a) and (b) at one or more different temperatures to determine an activation energy barrier for the chemical reaction.

16. The method of claim 1, further comprising repeating steps (a) and (b) at one or more different concentrations of the reactants to determine a reaction order for the chemical reaction.

17. A method for monitoring a catalytic chemical reaction, the method comprising:
   (a) exposing a solid surface to conditions to induce a chemical reaction of reactants at an interface formed between the solid surface and a liquid crystal, wherein the solid surface catalyzes the chemical reaction and the liquid crystal is characterized by an anchoring orientation that changes during the chemical reaction, wherein the chemical reaction is a nitration reaction; and
   (b) measuring the anchoring orientation of the liquid crystal at one or more time points and at one or more locations on the solid surface during step (a).

18. A method for monitoring a catalytic chemical reaction, the method comprising:
   (a) exposing a solid surface to conditions to induce a chemical reaction of reactants at an interface formed between the solid surface and a liquid crystal, wherein the solid surface catalyzes the chemical reaction and the liquid crystal is characterized by an anchoring orientation that changes during the chemical reaction, wherein the solid surface has a composition that varies across the solid surface; and
   (b) measuring the anchoring orientation of the liquid crystal at one or more time points and at one or more locations on the solid surface during step (a).

19. A method for monitoring a catalytic chemical reaction, the method comprising:
   (a) exposing a solid surface to conditions to induce a chemical reaction of reactants at an interface formed between the solid surface and a liquid crystal, wherein the solid surface catalyzes the chemical reaction and the liquid crystal is characterized by an anchoring orientation that changes during the chemical reaction, wherein the liquid crystal is characterized by an initial anchoring orientation prior to the chemical reaction and a different, final anchoring orientation after the chemical reaction and the initial anchoring orientation is a planar anchoring orientation and the final anchoring orientation is a homeotropic orientation; and
   (b) measuring the anchoring orientation of the liquid crystal at one or more time points and at one or more locations on the solid surface during step (a).

* * * * *